US012807874B2

(12) United States Patent
Khramov et al.

(10) Patent No.: US 12,807,874 B2
(45) Date of Patent: Nov. 24, 2026

(54) WELLBORE FLUIDS INCLUDING EMULSIFIER COMPOSITIONS, AND RELATED METHODS OF OPERATING A WELLBORE AND FORMING THE EMULSIFIER COMPOSITIONS

(71) Applicant: Schlumberger Technology Corporation, Sugar Land, TX (US)

(72) Inventors: Dimitri Khramov, Katy, TX (US); Evgeny Barmatov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 416 days.

(21) Appl. No.: 18/405,513

(22) Filed: Jan. 5, 2024

(65) Prior Publication Data

US 2025/0223497 A1 Jul. 10, 2025

(51) Int. Cl.

| | |
|---|---|
| ***C09K 23/00*** | (2022.01) |
| ***C09K 8/035*** | (2006.01) |
| ***C09K 23/38*** | (2022.01) |
| ***C09K 23/46*** | (2022.01) |

(52) U.S. Cl.
CPC ............ *C09K 23/018* (2022.01); *C09K 8/035* (2013.01); *C09K 23/38* (2022.01); *C09K 23/46* (2022.01)

(58) Field of Classification Search
CPC ...... C09K 23/018; C09K 8/035; C09K 23/38; C09K 23/46
See application file for complete search history.

(56) References Cited

U.S. PATENT DOCUMENTS 12,565,609 B2 3/2026 Khramov
2026/0015540 A1 1/2026 Foster

FOREIGN PATENT DOCUMENTS

WO 2019028198 A1 2/2019
WO WO-2022066205 A1 * 3/2022 ............... C09K 8/36

* cited by examiner

*Primary Examiner* — Crystal J Lee
(74) *Attorney, Agent, or Firm* — Jeffrey D. Frantz

(57) ABSTRACT

A wellbore fluid includes a base fluid and an emulsifier composition comprising an emulsifier and glycerol. The emulsifier comprises a reaction product of a bis-amide and at least one of maleic acid, maleic anhydride, fumaric acid, succinic acid, or succinic anhydride. The bis-amide includes a reaction product of one or more fatty acid esters and a polyalkylamine. Related methods of operating a wellbore and forming the emulsifier composition are also disclosed.

19 Claims, 3 Drawing Sheets

WELLBORE FLUIDS INCLUDING EMULSIFIER COMPOSITIONS, AND RELATED METHODS OF OPERATING A WELLBORE AND FORMING THE EMULSIFIER COMPOSITIONS

CROSS-REFERENCE TO RELATED APPLICATIONS

N/A

BACKGROUND OF THE DISCLOSURE

Wellbore drilling operations include drilling a bore in a formation to access reservoirs of hydrocarbons and other subsurface resources. During drilling of a wellbore, various fluids may be circulated into the wellbore through a drill pipe and drill bit, and may subsequently flow upward through the wellbore to the surface. For example, a drilling fluid (e.g., an aqueous-based fluid or an oil-based fluid) may be pumped down the inside of the drill pipe, through the drill bit, and into the wellbore. The drilling fluid returns to the surface through the annulus. The drilling fluid may lubricate and cool the drill bit, facilitate transport of formation cuttings to the surface, prevent formation blowouts by maintaining a hydrostatic pressure greater than the formation pressure, maintain well stability, and reduce fluid loss to the formation.

Drilling fluids may be water-based (aqueous-based), or drilling fluids may be non-aqueous based, such as oil-based or synthetic-based drilling fluids. In non-aqueous drilling fluids, water is the dispersed phase and oil (or a synthetic material) is the dispersion, or continuous phase. Non-aqueous drilling fluids may reduce formation damage to water-sensitive formations, such as water-sensitive clays.

Non-aqueous drilling fluids may be stabilized with an emulsifier. However, some emulsifiers may negatively impact the rheology of the drilling fluid, such as by increasing the low shear rate viscosity (LSRV), which increases the effective circulating density (ECD) and may result in wellbore integrity issues. Further, some emulsifiers may cause the drilling fluid to exhibit a high gel strength, which may lead to increased surge pressure when mud pumps are restarted after a period of static conditions, resulting in difficulties with inserting or removing the drill string from the well after the well has been in a static condition.

Commercially available emulsifiers are often contaminated with undesired reaction by-products of the formation process of the emulsifiers. However, the reaction by-products may negatively affect the fluid performance of the drilling fluid and, therefore, require expensive purification processes before use in a drilling fluid.

SUMMARY

In some embodiments, a wellbore fluid comprises a base fluid and an emulsifier composition. The emulsifier composition comprises an emulsifier comprising a reaction product of a bis-amide and at least one of maleic acid, maleic anhydride, fumaric acid, succinic acid, or succinic anhydride.

In some embodiments, a method of operating a wellbore comprises pumping a drilling fluid into a wellbore extending through an earth formation, and circulating the drilling fluid through the wellbore while drilling the earth formation. The drilling fluid comprises a base fluid and an emulsifier composition. The emulsifier composition comprises an amidoamine comprising a reaction product of a bis-amide and a dicarboxylic acid, the bis-amide comprising a reaction product of a fatty acid ester and diethylenetriamine, and glycerol.

In some embodiments, a method of forming an emulsifier composition for a wellbore fluid comprises mixing a fatty acid ester with a polyalkylamine to form a bis-amide and an alcohol, mixing a dicarboxylic acid with the bis-amide and the alcohol to form a reaction mixture, and heating the reaction mixture and reacting the bis-amide with the dicarboxylic acid to form an emulsifier comprising a reaction product of the bis-amide and the dicarboxylic acid and an emulsifier composition comprising the emulsifier and the alcohol.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
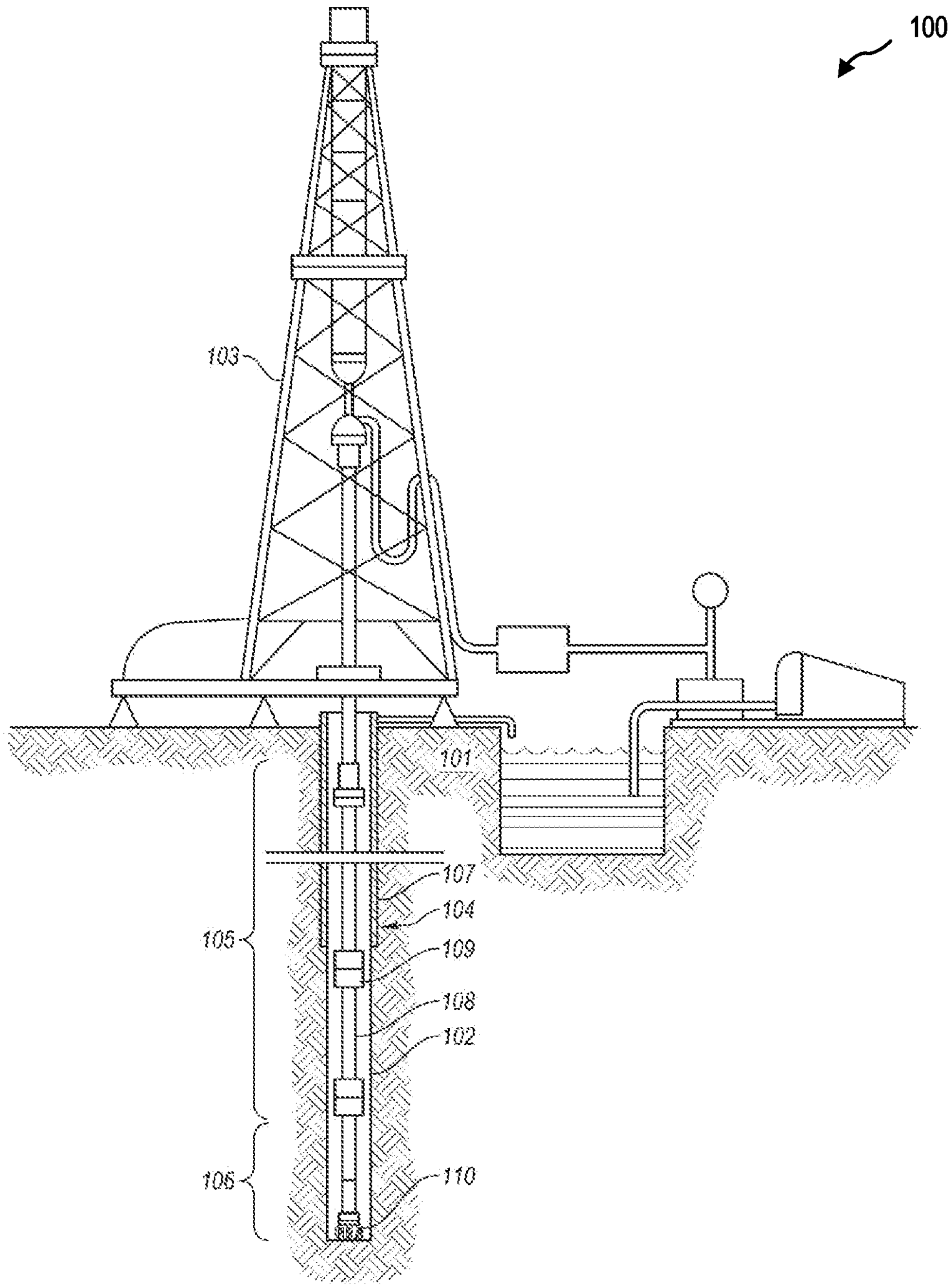
FIG. 1 is a representation of a drilling system for drilling an earth formation to form a wellbore, according to at least one embodiment of the present disclosure.

As used herein, the terms "acid number" or "acid value" refer to the number of milligrams of potassium hydroxide equivalent to the acidity in 1 gram of a sample. Acid number may be determined by non-aqueous titration as described in WO 2019/028198, which is hereby incorporated herein in its entirety by this reference.

As used herein, the terms "amine number" or "amine value" refer to the number of milligrams of potassium hydroxide equivalent to the amine basicity in 1 g of sample. Amine number may be determined by non-aqueous titration as described in WO2019/028198, which is hereby incorporated herein by reference.

As used herein, a "hydrocarbyl" group means and includes a $C_1$ to $C_{100}$ hydrocarbon (e.g., a radical) and may be linear, branched, and/or cyclic (e.g., include one or more cyclic groups, which may be aromatic or non-aromatic). The $C_1$ to $C_{100}$ hydrocarbyl group may be saturated or unsaturated (e.g., include one or more carbon-carbon double bonds (e.g., include one or more alkenyl groups)). Non-limiting examples of hydrocarbyl groups include methyl, ethyl, n-propyl, isopropyl, n-butyl, isobutyl, sec-butyl, tert-butyl, pentyl, iso-amyl, hexyl, heptyl, octyl, cyclopropyl, cyclobutyl, cyclopentyl, cyclohexyl, cyclooctyl, and the like, including substituted analogues. For example, at least one hydrogen atom may be substituted with at least one heteroatom or a heteroatom-containing group, such as a halogen (e.g., F, Cl, Br, I), or at least one functional group, such as $NR'_2$, O R', Se R', TER', $PR'_2$, $ASR'_2$, $SbR'_2$, SR', $BR'_2$, $SIR'_3$, $GER'_3$, $SnR'_3$, $PbR'_3$, and the like, wherein R' is hydrogen, alkyl, hydroxyalkyl, carboxyalkyl, or another group, or where at least one heteroatom has been inserted within a hydrocarbyl ring.

As used herein, a fatty acid has a chemical formula of R—COOH, wherein R corresponds to a hydrocarbyl group. As used herein, a fatty acid ester has a chemical formula of R—$COOR_x$, wherein R is a hydrocarbyl group (e.g., of the fatty acid), and $R_x$ is another hydrocarbyl group. In some embodiments, $R_x$ comprises an alkyl group, such as a methyl group. In some embodiments, $R_x$ comprises a triol group, such as a glycerol group.

As used herein, the term "bis-amide" refers to a compound having two identical amide groups. A polyamide may include a compound having two or more amide groups, which may or may not be identical.

As used herein, the term "polyalkylamine" refers to a compound having alternating amine and alkyl groups. The polyalkylamine may be linear or branched.

This disclosure generally relates to devices, systems, and methods of manufacturing and using wellbore fluid additives for downhole applications, such as wellbore fluid emulsification using one or more emulsifiers in an emulsifier composition. The emulsifier composition may be used in a wellbore fluid, such as a drilling fluid, drill-in fluids (also referred to as "reservoir drill-in fluids" (RDF)), workover fluids, spacer fluids (e.g., a fluid introduced into the wellbore after a drilling fluid and prior to a cement composition to flush residual drilling fluid from the annulus), stimulation fluids, or other wellbore fluids.

The emulsifier composition may be provided as a component of the wellbore fluid, such as of a drilling fluid. In some embodiments, the emulsifier composition is used in an oil-based or synthetic-based wellbore fluid (e.g., an oil-based drilling fluid or a synthetic-based drilling fluid, which may also be referred to as a non-aqueous drilling fluid or an invert emulsion drilling fluid).

The emulsifier composition may include one or more emulsifiers and one or more additional components. The emulsifier may comprise an amidoamine including one or more fatty acid chains. The amidoamine may comprise the reaction product of a bis-amide and a dicarboxylic acid, such as at least one of maleic acid, maleic anhydride, fumaric acid, succinic acid, or succinic anhydride and may be referred to herein as an "acid-substituted amidoamine". In some embodiments, the acid-substituted amidoamine is heated to form one or more isomers of the acid-substituted amidoamine. The bis-amide may comprise a reaction product of a polyalkylamine (DETA) and a fatty acid ester. The polyalkylamine may include, for example, diethylenetriamine (DETA), and the fatty acid ester may include a triglyceride, such as, for example, vegetable oil. Reaction of the polyalkylamine and the fatty acid ester forms the bis-amide and an alcohol (e.g., glycerol in the case of a triglyceride fatty acid ester). In some such embodiments, the one or more additional components comprise the alcohol.

The bis-amide comprises the reaction product of the polyalkylamine and the fatty acid ester. In some embodiments, the fatty acid ester comprises a mixture of different fatty acid esters. In some embodiments, the fatty acid ester comprises a triglyceride, such as vegetable oil, fish oil, algal oil, palm oil, or another oil. The reaction between the triglyceride and the polyalkylamine forms the bis-amide and glycerol. In some embodiments, forming the bis-amide from the fatty acid ester reduces (e.g., prevents) the formation of undesired imidazoline-amides that may otherwise form during the reaction of a corresponding fatty acid and the polyalkylamine.

The bis-amide may be reacted with a dicarboxylic acid to form an emulsifier comprising the acid-substituted amidoamine. The acid-substituted amidoamine may be heat treated to form one or more isomers thereof. The acid-substituted amidoamine and isomers thereof may individually include two amide groups, the amides corresponding to the fatty acids of the fatty acid esters. In addition, the acid-substituted amidoamine and isomers thereof further includes a tertiary amine bonded to the dicarboxylic acid group. In some embodiments, the amide groups are the same. In other embodiments, the amide groups are different. The fatty acid ester and the polyalkylamine do not form viscous salts of fatty acids and the polyalkylamine. Such viscous salts are formed during the reaction of fatty acids (rather than fatty acid esters) and polyalkylamines. Advantageously, compared to when the bis-amide is formed by reacting a fatty acid with the polyalkylamine, reacting the fatty acid ester with the polyalkylamine forms the alcohol and does not form water. A higher water content reduces the reaction rate between the fatty acid and the polyalkylamine, while a low water content increases the amount of undesired imidazoline-amides that are formed. By way of contrast, forming the bis-amide from the fatty acid ester reduces (e.g., prevents) the formation of imidazoline-amides. In addition, the alcohol (e.g., glycerol) may not react with (e.g., substantially react with) the bis-amide during the reaction of the bis-amide and the dicarboxylic acid. The presence of the alcohol (e.g., glycerol) with the reaction product of the bis-amide and the dicarboxylic acid acts as a pour point depressant, reducing the temperature at which the reaction product is flowable. In addition, forming the bis-amide directly from fatty acid esters (rather than from fatty acids) facilitates forming bis-amides including various amide groups, such as unsaturated amide groups. Such unsaturated fatty acids may be difficult to obtain from triglycerides due to the high reactivity of the unsaturated fatty acids.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

During drilling operations, a drilling fluid may be used to facilitate lubrication and cooling of the bit 110 and removal of earth formation 101 cuttings. In some embodiments, the drilling fluid may include an emulsifier composition including one or more emulsifiers formulated and configured to facilitate the formation of an emulsion (e.g., the dispersion of an immiscible liquid into another) by reducing the interfacial tension between two liquids. In some embodiments, the drilling fluid includes an emulsifier configured to form a stable water-in-oil (e.g., invert) emulsion. The emulsifier may comprise an amidoamine including two amide groups and a tertiary amine bonded to a carboxylic acid group. In addition to the emulsifier, the emulsifier composition may include one or more additional components, such as one or more alcohols. In some embodiments, the one or more additional components comprises glycerol.

The drilling fluid may include a base fluid, the emulsifier composition, and one or more additives (e.g., one or more of surfactants, bridging materials, viscosifiers, thinners (e.g., dispersion aids), weighting materials, filtration control agents, shale stabilizers, pH buffers, scavengers, emulsion activators, gelling agents, shale inhibitors, defoamers, foaming agents, scale inhibitors, solvents, rheological additives, or other additives).

The drilling fluid may include a non-aqueous-based drilling fluid (e.g., an oil-based drilling fluid, a synthetic-based drilling fluid). When lifting cuttings of the earth formation 101, the drilling fluid may be referred to as a "drilling mud." In some embodiments, the drilling fluid comprises a non-aqueous-based drilling fluid, such as an oil-based drilling fluid or a synthetic-based drilling fluid. In some such embodiments, the base fluid comprises an oleaginous or oil-based fluid and may include a natural or synthetic oil. In some embodiments the oleaginous fluid is selected from the group consisting of at least one of diesel oil, mineral oil, a synthetic oil, (e.g., hydrogenated and unhydrogenated olefins including polyalpha olefins, linear and branched olefins), polydiorganosiloxanes, siloxanes, organosiloxanes, or esters of fatty acids (e.g., straight chained, branched and cyclical alkyl ethers of fatty acids).

An internal phase of an emulsion of the oleaginous or oil-based fluid may include one or more salts. The one or more salts may provide a desired density to the drilling fluid and may also reduce the effect of the drilling fluid on hydratable clays and shales the earth formation 101. The salts may include salts of one or more of sodium, calcium, aluminum, magnesium, zinc, potassium, strontium, or lithium, and salts of one or more of chlorides, bromides, carbonates, iodides, chlorates, bromates, formates, nitrates, oxides, phosphates, sulfates, silicates, or fluorides. In some embodiments, the salt comprises a divalent halide, such as an alkaline earth halide (e.g., calcium chloride ($CaCl_2$)), calcium bromide ($CaBr_2$)), or a zinc halide. The salt may include cesium formate (HCOOR), sodium bromide (NaBr), potassium bromide (KBr), and cesium bromide (CsBr). The particular composition of the salt may be selected based on compatibility with the earth formation 101 and/or to match the brine phase of a completion fluid and/or a non-aqueous fluid. In some embodiments, the salt comprises calcium chloride.

The salt may constitute from about 5.0 weight percent to about 30.0 weight percent of the drilling fluid, such as from about 5.0 weight percent to about 10.0 weight percent, from about 10.0 to about 20.0 weight percent, or from about 20.0 weight percent to about 30.0 weight percent of the drilling fluid. However, the disclosure is not so limited, and the weight percent of the salt and the water in the drilling fluid may be different than that described.

As described above, the drilling fluid may include at least one emulsifier composition including at least one emulsifier formulated and configured to reduce an amount of wellbore fluid (e.g., the drilling fluid) lost in the earth formation 101 (e.g., during drilling operations). For example, the emulsifier may facilitate formation of an emulsion by reducing the interfacial tension between the oleaginous phase and the aqueous phase of the wellbore fluid. In some embodiments, the emulsifier facilitates formation of a water-in-oil (e.g., an invert) emulsion. In addition to the emulsifier, the emulsifier composition may further include at least one additional component, which may comprise a reaction by-product formed during the formation of the emulsifier. In some embodiments, the at least one additional component comprises a pour point depressant, such as glycerol.

The emulsifier may comprise at least one amidoamine comprising a reaction product of at least one bis-amide and a dicarboxylic acid and may be referred to herein as an acid-substituted amidoamine. The acid-substituted amidoamine may be heat treated to form one or more isomers thereof. In some such embodiments, each of the acid-substituted amidoamine and the isomers thereof individually include two fatty acid amides and a tertiary amine bonded to a carboxylic acid group. The dicarboxylic acid may include at least one of maleic acid, maleic anhydride, fumaric acid, succinic acid, or succinic anhydride. The bis-amide may comprise the reaction product of one or more fatty acid esters and a polyalkylamine including a compound having alternating amine and alkyl groups. The alkyl groups may be linear or branched. By way of non-limiting example, the polyalkylamine may include at least one of diethylenetriamine (DETA), triethylenetetramine (TETA), tetraethylene pentaaminc (PETA), or pentaethylenchexamine (PEHA). In some embodiments, the polyalkylamine comprises diethylenetriamine. In some embodiments, the polyalkylamine comprises a symmetrical compound.

In some embodiments, the fatty acid ester comprises a triglyceride, such as those present in vegetable oil, fish oil, algal oil, palm oil, andiroba oil, avocado oil, coconut oil, canola oil, peanut oil, linseed oil, copaiba oil, olive oil, pequi oil, pracaxi oil, corn oil, cottonseed oil, grapeseed oil, passionfruit oil, sunflower oil, soybean oil, or other oils (e.g., plant-based oils). In some such embodiments, the fatty acid ester comprises a triglyceride including more than one type of fatty acid chains on the glycerol backbone. As described in additional detail below, the reaction between the triglyceride and the polyalkylamine may proceed in stepwise fashion, wherein the triglyceride is converted to a diglyceride and a bis-amide, the diglyceride is converted to a monoglyceride and a bis-amide; and the monoglyceride is converted to a bis-amide and the glycerol.

As described above, the emulsifier comprises an acid-substituted amidoamine comprising the reaction product of a bis-amide and a dicarboxylic acid and one or more isomers of the acid-substituted amine. The acid-substituted amine may be substituted with maleic acid and may have the general formula of Structure (I) below. The acid-substituted amine may be substituted with other materials, such as maleic anhydride, fumaric acid, succinic acid, or succinic anhydride. Upon heat treatment, the acid-substituted amidoamine may have the general formula of Structure (II) below and/or may include an isomer of the acid-substituted amidoamine may have the general formula of Structure (III) below:

(I)

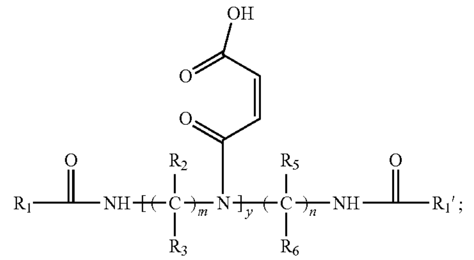

(II)

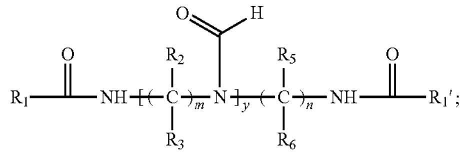

(III)

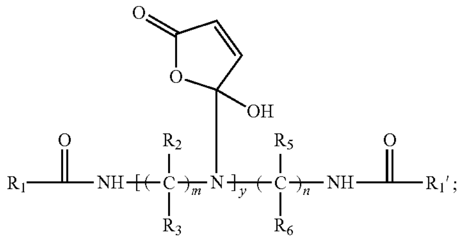

wherein $R_1$ and $R_1$' individually comprise a $C_4$ to $C_{30}$ hydrocarbyl group based on the fatty acid ester; $R_2$, $R_3$, $R_5$, and $R_6$ are independently hydrogen (H), or $C_1$ to $C_4$ alkyl groups, $C_1$ to $C_4$ alkoxyalkyl groups, or $C_1$ to $C_4$ hydroxyalkyl groups; n and m are integers from 1 to 10; and y is an integer from 1 to 5. In some embodiments, $R_1$ and $R_1$' are the same. In other embodiments, the $R_1$ and $R_1$' are different. In some embodiments, m and n are the same integer.

In some embodiments, each of $R_2$, $R_3$, $R_5$, and $R_6$ comprise hydrogen; m and n are 2; and y is 1. In some such embodiments, the bis-amide from which the emulsifier is formed comprises a reaction product of a fatty acid ester and diethylenetriamine. In some such embodiments, the acid-substituted amidoamine has the general formula of Structure (IV) below and Structure (V) below, depending on the dicarboxylic acid from which the acid-substituted amidoamine is formed. In addition, the isomer of the acid-substituted amidoamine may have the general formula of Structure (VI) below, wherein each of $R_1$ and $R_1$' are the same as described above:

(IV)

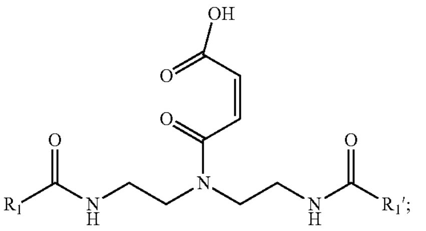

(V)

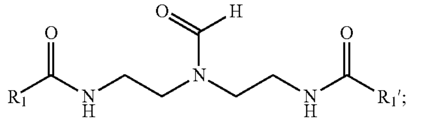

(VI)

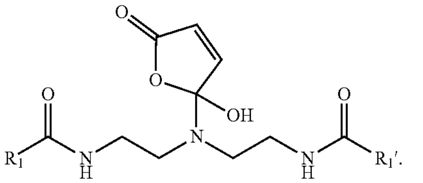

As described in additional detail herein, each of $R_1$ and $R_1$' may correspond to (e.g., be based on) the fatty acid esters (e.g., the triglycerides) from which the bis-amide is formed. More particularly, each of $R_1$ and $R_1$' may individually comprise a $C_4$ to $C_{30}$ hydrocarbyl group based on the R group of the fatty acid from which the fatty acid ester is formed. For example, $R_1$ and the carbonyl group bonded to $R_1$ together may comprise an amide corresponding to one of the R groups from which the fatty acid ester is formed; and $R_1$' and the carbonyl group bonded to $R_1$' together may comprise an amide corresponding to one of the R groups from which the fatty acid ester is formed. Stated another way, each of $R_1$ and $R_1$' may individually include a $C_4$ to $C_{30}$ hydrocarbyl group of the fatty acid bonded to the carbonyl carbon of the fatty acid ester. In other words, where the fatty acid ester has the formula R—$COOR_x$, the fatty acid has the formula R—COOH and R corresponds to the aliphatic chain bonded to the carboxylic group or the ester group of the respective fatty acid or fatty acid ester. Each of $R_1$ and $R_1$' may individually be saturated or unsaturated (e.g., include one or more alkenyl groups (e.g., one or more carbon to carbon double bonds)) and may individually be linear, branched, and/or include one or more cyclic groups.

The bis-amide may comprise the reaction product of the fatty acid ester and the polyalkylamine. The fatty acid ester may comprise an ester of one or more fatty acids. The one or more fatty acids of the fatty acid ester may be saturated or unsaturated, and may be linear, branched, or include one or more cyclic groups. By way of non-limiting example, the one or more fatty acids may include one or more of valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, behenic acid, tricosylic acid, lignoceric acid, pentacosylic acid, cerotic acid, carboceric acid, montanic acid, nonacosylic acid, meliisic acid, lacceroic acid, psyllic acid, linolenic acid, stearidonic acid, eicosapentaenoic acid, cervonic acid, linoleic acid, linolelaidic acid, arachidonic acid, docosatetranoic acid, palmitoleic acid, vaccenic acid, paullinic acid, oleic acid, elaidic acid, erucic acid, crotonic acid, myristoleic acid, palmitoleic acid, sapienic acid, oleic acid, elaidic acid, gadoleic acid, or eicosenoic acid.

In some embodiments, the fatty acid of the fatty acid ester comprises a saturated fatty acid (e.g., one or more of valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, behenic acid, tricosylic acid, lignoceric acid, pentacosylic acid, cerotic acid, carboceric acid, montanic acid, nonacosylic acid, meliisic acid, lacceroic acid, psyllic acid). In other embodiments, the fatty acid of the fatty acid ester comprises an unsaturated fatty acid (e.g., one or more of linolenic acid, stearidonic acid, eicosapentaenoic acid, cervonic acid, linoleic acid, linolelaidic acid, arachidonic acid, docosatetranoic acid, palmitoleic acid, vaccenic acid, paullinic acid, oleic acid, elaidic acid, erucic acid, crotonic acid, myristoleic acid, palmitoleic acid, sapienic acid, oleic acid, elaidic acid, gadoleic acid, and eicosenoic acid). The unsaturated fatty acid may be a monounsaturated fatty acid having one carbon to carbon double bond; a di-unsaturated fatty acid having two carbon to carbon double bonds; a tri-unsaturated fatty acid having three carbon to carbon double bonds; a tetra-unsaturated fatty acid having four carbon to carbon double bonds; a penta-unsaturated fatty acid having five carbon to carbon double bonds; a hexa-unsaturated fatty acid having six carbon to carbon double bonds; or a polyunsaturated fatty acid having more than six carbon to carbon double bonds.

The fatty acid ester may be an ester of the one or more fatty acids. In some embodiments, the fatty acid ester comprises one or more of a hexanoate (e.g., a glycerol hexanoate), a heptanoate (e.g., a glycerol heptanoate), an octanoate (also referred to as a caprylate) (e.g., a glycerol octanoate), a nonanoate (e.g., a glycerol nonanoate), a decanoate (e.g., a glycerol decanoate), a laurate (e.g., a glycerol laurate), a myristate (e.g., a glyceryl myristate), a palmitate (e.g., a glyceryl palmitate), a stearate (e.g., a glyceryl stearate), a behenate group (e.g., a glyceryl behenate), a lignocerate (e.g., a glyceryl lignocerate), a pentadecanoate (e.g., a glyceryl pentadecanoate), a heptadecanoate (e.g., a glyceryl heptadecanoate), an octacosanoate (e.g., a glyceryl octacosanoate), a nonacosanoate (e.g., a glyceryl nonacosanoate), a dotriacontanoate (e.g., a glyceryl dotriacontanoate), an oleate (e.g., a glyceryl oleate), a myristoleate (e.g., a glyceryl myristoleate), a palmitoleate (e.g., a glyceryl palmitoleate), a sapienate (e.g., a glyceryl sapienate), an elaidate (e.g., a glycerol elaidate), a vaccenic acid ester (e.g., a vaccenic acid methyl ester), a linoleate (a glyceryl linoleate), a linoelaidate (e.g., a glyceryl linolelaidate), an arachidonate (e.g., a glyceryl arachidonate), an eicosapentaenoate (e.g., a glyceryl eicosapentaenoate), an erucate (e.g., a glyceryl erucate), a docosahexaenoate (e.g., a glyceryl docosahexaenoate), a stearidonate (e.g., a glyceryl stearidonate), a cervonoate (e.g., a glyceryl cervonoate), a gadoleate (e.g., a glyceryl gadoleate), an eicosenoate (e.g., a glyceryl eicosenoate), a pinolenic acid ester group, an eleostearate (e.g., a glyceryl eleostearate), an eicosatrienoate (e.g., a glyceryl eicosatrienoate), and a stearidonoate (e.g., a glyceryl stearidonoate).

In some embodiments, the fatty acid ester comprises a glyceride, such as a monoglyceride, a diglyceride, or a triglyceride. In some embodiments the fatty acid ester from which the bis-amide is formed comprises a monoglyceride. The monoglyceride may include a glycerol linked to a fatty acid via an ester bond. By way of non-limiting example, the monoglycerides may include one or more of glyceryl monostearate, glyceryl myristate, glyceryl palmitate, glyceryl monooleate, glyceryl monobehenate, glyceryl monocaprylate, glyceryl monodecanoate, glycerol monolinoleate, glyceryl monolaurate, glyceryl monodocosahexaenoate, or glyceryl monoeicosapentaenoate.

In some embodiments the fatty acid ester from which the bis-amide is formed comprises a diglyceride. In some embodiments, the fatty acid ester comprises a diglyceride including two fatty acid chains each covalently bonded to a glycerol molecule through ester linkages. The fatty acids of the diglyceride may be the same fatty acid, or may be different fatty acids.

In some embodiments, the fatty acid ester from which the bis-amide is formed comprises a triglyceride, such as those present in vegetable oil or other oils. In some embodiments, the fatty acid ester comprises one or more triacylglycerols (also referred to as triglycerides). In some embodiments, the fatty acids of the triglyceride comprise the same fatty acids. In other embodiments, at least one fatty acid of the triglyceride comprises a different fatty acid than at least another fatty acid of the triglyceride.

The triglycerides may be present in one or more of vegetable oil, fish oil, algal oil, palm oil, andiroba oil, avocado oil, coconut oil, canola oil, peanut oil, linseed oil, copaiba oil, olive oil, pequi oil, pracaxi oil, corn oil, cottonseed oil, grapeseed oil, passionfruit oil, sunflower oil, soybean oil, or another plant or animal-based oil. In some embodiments, the triglyceride comprises vegetable oil. In other embodiments, the triglyceride comprises one or more of fish oil, algal oil, or palm oil. By way of non-limiting example, the triglyceride may include one or more of glyceryl tristearate, glyceryl trimyristate, glyceryl tripalmitate, glyceryl trioleate, glyceryl tribehenate, glycerol tricaprylate, glyceryl tridecanoate, glyceryl trilinoleate, glyceryl trilaurate, glyceryl tridocosahexaenoate, or glyceryl trieicosapentaenoate. In some embodiments, the triglyceride is formed from more than one type of fatty acid. In some such embodiments, the triglycerides comprise mixed triglycerides. For example, the triglyceride may include at least a first type of fatty acid chain bonded to the glycerol group, and at least a second type of fatty acid chain bonded to the glycerol group, the second type of fatty acid chain comprising a different material composition (e.g., a different type of fatty acid) than the first type of fatty acid chain. In some embodiments, the first type of fatty acid chain is a saturated fatty acid and the second type of fatty acid chain is unsaturated. In other embodiments, each of the first type of fatty acid chain and the second type of fatty acid chain are saturated or unsaturated.

As described above, $R_1$ and $R_1'$ may be based on the fatty acid ester from which the bis-amide is formed. For example, $R_1$ and $R_1'$ correspond to the aliphatic group bonded to the ester group of the respective one of the fatty acid ester. In other words, where the fatty acid ester comprises, for example, docosahexaenoic acid ester, R comprises $CH_3(CH_2)_4CH{=}CHCH_2CH{=}CHCH_2CH{=}CHCH_2CH{=}CH(CH_2)_5{-}$.

Each of $R_1$ and $R_1'$ may individually be saturated or unsaturated, and may individually be linear, branched, and/or include one or more cyclic groups. By way of non-limiting example, each of $R_1$ and $R_1'$ may individually include a pentyl group (e.g., $CH_3(CH_2)_3CH_2{-}$) (e.g., where the fatty acid ester comprises a hexanoate, because the carbonyl carbon of the hexanoate in Structure (I) above is illustrated separate from the R and $R_1'$ group), a hexyl group (e.g., $CH_3(CH_2)_4CH_2{-}$), a heptyl group (e.g., $CH_3(CH_2)_5CH_2{-}$), an octyl group (e.g., $CH_3(CH_2)_6CH_2{-}$), a nonyl group (e.g., $CH_3(CH_2)_7CH_2{-}$), a decyl group (e.g., $CH_3(CH_2)_3CH_2{-}$), an undecyl group (e.g., $CH_3(CH_2)_9CH_2{-}$), a dodecyl group (e.g., $CH_3(CH_2)_{10}CH_2{-}$), a tridecyl group (a dodecyl group (e.g., $CH_3(CH_2)_{11}CH_2{-}$), a tetradecyl group (e.g., $CH_3(CH_2)_{12}CH_2{-}$), a pentadecyl group (e.g., $CH_3(CH_2)_{13}CH_2{-}$), a hexadecyl group (e.g., $CH_3(CH_2)_{14}CH_2{-}$), a heptadecyl group (e.g., $CH_3(CH_2)_{15}CH_2{-}$), an octadecyl group (e.g., $CH_3(CH_2)_{16}CH_2{-}$), a nonadecyl group (e.g., $CH_3(CH_2)_{17}CH_2{-}$), or additional saturated $C_{20}$ to $C_{30}$ alkyl groups.

In some embodiments, each of $R_1$ and $R_1'$ may individually include one or more of a $CH_3(CH_2)_7CH{=}CH(CH_2)_6CH_2{-}$ group (e.g., where the fatty acid comprises oleic acid and the fatty acid ester comprises an oleate), a $CH_3(CH_2)_3CH{=}CH(CH_2)_6CH_2{-}$ group (e.g., such as where the fatty acid comprises myristoleic acid and the fatty acid ester comprises a myristoleate), a $CH_3(CH_2)_5CH{=}CH(CH_2)_6CH_2{-}$ group (e.g., where the fatty acid comprises palmitoleic acid and the fatty acid ester comprises a palmitoleate), a $CH_3(CH_2)_8CH{=}CH(CH_2)_3CH_2{-}$ group (e.g., such as where the fatty acid comprises sapienic acid), a $CH_3(CH_2)_7CH{=}CH(CH_2)_6CH_2{-}$ group (e.g., such as where the fatty acid comprises elaidic acid), a $CH_3CH_2CH{=}CHCH_2CH{=}CHCH_2CH{=}CH(CH_2)_6CH_2{-}$ group (e.g., where the fatty acid comprises linolenic acid and the fatty acid ester comprises a linoleate), a $CH_3(CH_2)_4CH{=}CHCH_2CH{=}CH(CH_2)_6CH_2{-}$ group (e.g., where the fatty acid comprises linoleic acid, a $CH_3CH_2CH{=}CHCH_2CH{=}CHCH_2CH{=}CHCH_2CH{=}CH(CH_2)_3CH_2{-}$ group (e.g., where the fatty acid comprises stearidonic acid), a $CH_3CH_2CH{=}CHCH_2CH{=}CHCH_2CH{=}CHCH_2CH{=}CHCH_2CH{=}CH(CH_2)_2CH_2{-}$ group (e.g., where the fatty acid comprises eicosapentaenoic acid), a $CH_3CH_2CH{=}CHCH_2CH{=}CHCH_2CH{=}CHCH_2CH{=}CHCH_2CH{=}CHCH_2CH{=}CHCH_2CH_2{-}$ group (e.g., where the fatty acid comprises cervonic acid), a $CH_3(CH_2)_4CH{=}CHCH_2CH{=}CH(CH_2)_6CH_2{-}$ group (e.g., where the fatty acid comprises linolelaidic acid), a $CH_3(CH_2)_7CH{=}CH(CH_2)_{10}CH_2{-}$ group (e.g., where the fatty acid comprises erucic acid), and a $CH_3(CH_2)_4CH{=}CHCH_2CH{=}CHCH_2CH{=}CHCH_2CH{=}CH(CH_2)_2CH_2{-}$ group (e.g., where the fatty acid comprises arachidonic acid). Of course, the disclosure is not so limited, and each of $R_1$ and $R_1'$ may individually include one or more other saturated or unsaturated groups corresponding to the fatty acids of the fatty acid ester (e.g., the fatty acids present in the triglyceride).

By way of non-limiting example, $R_1$ and $R_1'$ individually comprise a $C_4$ to $C_{30}$ alkyl based on the fatty acid ester. The $C_4$ to $C_{30}$ alkyl may be linear or branched. In addition, the $C_4$ to $C_{30}$ alkyl may individually be saturated or may be unsaturated.

As described above, the bis-amide comprises a reaction product of a fatty acid ester (e.g., a triglyceride) and a polyalkylamine including a compound having alternating amine and alkyl groups. The fatty acid ester may comprise an ester of one or more fatty acids. In some embodiments, the fatty acid ester comprises a glyceride, such as a triglyceride. In embodiments wherein the polyalkylamine comprises diethylenetriamine, the bis-amide may be formed according to Reaction Scheme (VII) below:

(VII)

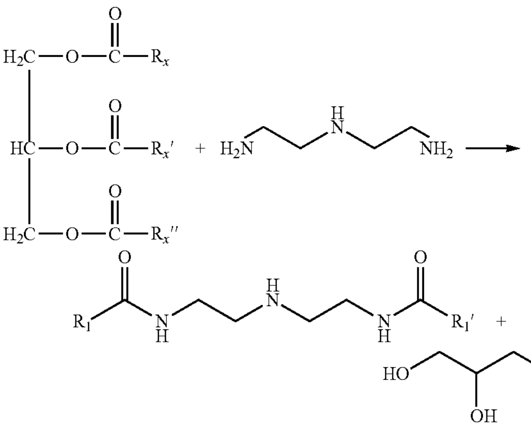

wherein $R_x$, $R_x'$, and $R_x''$ individually correspond to one of $R_1$ and $R_1'$ described above. In other words, $R_1$ and $R_1'$ depend on the composition of $R_x$, $R_x'$, and $R_x''$. In some embodiments, $R_1$ and $R_1'$ of the bis-amide comprise the same group. In other embodiments, $R_1$ and $R_1'$ of the bis-amide comprise different groups. Of course, if the polyalkylamine included a material other than diethylenetriamine, the bis-amide would have a different structure than that illustrated in Reaction Scheme (VII). For example, if a different polyalkylamine was used, the bis-amide may have the general formula of Structure (VIII) below:

(VIII)

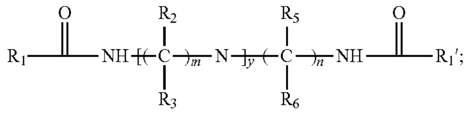

wherein each of $R_1$ and $R_1'$, $R_2$, $R_3$, $R_5$, and $R_6$, n, m, and y is are the same as described above.

In some embodiments, the fatty acid ester comprises vegetable oil and the triglycerides include fatty acid chains of one or more of (e.g., each of) caprylic acid, capric acid, oleic acid, and linoleic acid. In other embodiments, the fatty acid chains of the fatty acid ester include fatty acid chains of one or more of (e.g., each of) tall oil fatty acid, stearic acid, oleic acid, linoleic acid, and isostearic acid. In some embodiments, the fatty acid ester comprises fish oil and the triglycerides include fatty acid chains of one or more of (e.g., each of) docosahexaenoic acid (DHA) and eicosapentaenoic acid (EPA). In some embodiments, the fatty acid ester comprises algal oil and the triglycerides include fatty acid chains of one or more of (e.g., each of) omega-3 fatty acids (e.g., DHA, EPA), and may further include one or more omega-9 fatty acids. In some embodiments, the fatty acid ester comprises palm oil and the triglycerides include fatty acid chains of one or more of (e.g., each of) lauric acid, myristic acid, and palmitic acid. The fatty acids of the triglyceride may include a mixture of saturated fatty acids, monounsaturated fatty acids, and polyunsaturated fatty acids.

In some embodiments, and as illustrated in Reaction Scheme (VII), the reaction of the triglyceride and the polyalkylamine (e.g., DETA) may form a 1,3-bisamide and may not form (e.g. may not substantially form a 1,2-bisamide). Without being bound by any particular theory, it is believed that the formation of the 1,3-bisamide occurs due to steric hindrance between the triglyceride and the central nitrogen of the DETA. Accordingly, the use of the triglyceride to form the bis-amide is advantageous compared to the use of a fatty acid to form the bis-amide, because the triglyceride facilitates the formation of a greater amount of 1,3-bisamide and a lower amount of undesired 1,2-bisamide.

In some embodiments, the reaction between the fatty acid ester and the polyalkylamine proceeds at a temperature of about 140° C. The reaction between the fatty acid ester and the polyalkylamine may proceed at a temperature greater than about 110° C., such as greater than about 120° C., greater than about 130° C., or greater than about 140° C. In some embodiments, the reaction proceeds at a sufficient rate at a temperature of about 140° C. In some embodiments, the reaction proceeds until the amine number of the reaction solution is about 90 or less, indicating that the reaction is substantially complete.

In addition to forming the bis-amide, and as illustrated in Reaction Scheme (VII), the reaction between the fatty acid ester (e.g., the glyceride, such as the triglyceride) and the polyalkylamine may form the one or more additional components of the emulsifier composition. In some embodiments, the one or more additional components comprises an alcohol (e.g., glycerol in the case where the fatty acid ester comprises triglyceride). For example, where the fatty acid esters comprise a glyceride, such as a monoglyceride, a diglyceride, or a triglyceride, the alcohol includes glycerol. The glycerol may remain in the emulsifier composition when added to the wellbore fluid.

In other embodiments, such as where the fatty acid ester does not comprise a glyceride, the alcohol corresponds to the group bonded to the non-carbonyl carbon atom of the ester group. In some embodiments, the alcohol comprises methanol.

In some embodiments, the reaction between the polyalkylamine and the fatty acid ester (e.g., the triglycerides) does not form imidazoline-amides (e.g., does not form more than a negligible amount). By way of contrast, bis-amides formed by the reaction of fatty acids and an amine (rather than of fatty acid esters and amines) form water as a byproduct. At least a portion of the water must be removed from the reaction vessel to drive the reaction forward and form more bis-amide. However, removal of too much water may cause the fatty acids and the amine to react to form an imidazoline-amide, which are undesirable and are not effective emulsifiers. Forming the bis-amide by the direct reaction of the fatty acid ester and the amide (e.g., the polyalkylamine) reduces (e.g., prevents) the formation of imidazoline-amides. In addition, the alcohol (e.g., glycerol) by-product is not removed from the reaction vessel and remains in the emulsifier composition as a pour point depressant.

As described above, the acid-substituted amidoamine of the emulsifier comprises the reaction product of the bis-amide with a dicarboxylic acid. In some embodiments, the alcohol (e.g., the glycerol) may remain mixed with the bis-amide when the bis-amide is reacted with the dicarboxylic acid. In other embodiments, the alcohol may be removed from the bis-amide prior to reacting the bis-amide with the dicarboxylic acid. For example, in some such embodiments, the alcohol may be removed from the bis-amide by adding water to the solution including the bis-amide and the glycerol. Responsive to the addition of water, the alcohol and water mix and are separated from the bis-amide.

In some embodiments, the alcohol (e.g., the glycerol) is not separated from the bis-amide and the dicarboxylic acid is added to the reaction solution including the bis-amide and the alcohol. The dicarboxylic acid may include at least one of maleic acid, maleic anhydride, fumaric acid, succinic acid, succinic anhydride, or another dicarboxylic acid. In some embodiments, the dicarboxylic acid comprises maleic acid. The acid-substituted amidoamine may be formed by reacting the bis-amide with the dicarboxylic acid, as shown in Reaction Scheme (IX) below, wherein the dicarboxylic acid comprises maleic anhydride.

(IX)

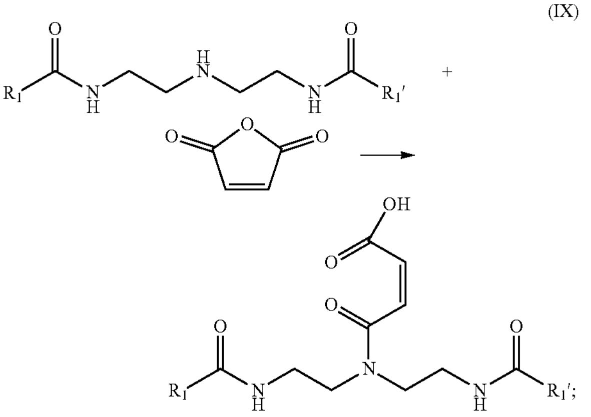

wherein each of $R_1$ and $R_1'$ are the same as described above. In some embodiments, the reaction between the bis-amide and maleic acid forms the same reaction product illustrated in Reaction Scheme (IX) above. Of course, where the bis-amide comprises the structure of Structure (VIII), the acid-substituted amidoamine has the general formula of Structure (I) above.

The reaction between the bis-amide and the dicarboxylic acid may proceed at a higher temperature than the reaction between the fatty acid ester and the polyalkylamine. In some embodiments, the reaction between the bis-amide and the dicarboxylic acid proceeds at a temperature within a range of from about 140° C. to about 170° C. In some embodiments, the temperature is at least about 165° C. In some embodiments, the reaction between the bis-amide and the dicarboxylic acid proceeds at about 165° C. In addition, responsive to exposure to the temperature, at least a portion of the acid-substituted amidoamine to form one or more isomers of the heat-treated amidoamine to form an amidoamine having the general formula of Structure (III) above.

In some embodiments, the emulsifier composition includes an emulsifier comprising one or more acid-substituted amidoamines (e.g., Structure (I) and/or Structure (II) above) comprising the reaction product of the bis-amide and the dicarboxylic acid; and may further include one or more isomers of the acid-substituted amidoamines (e.g., Structure (III) above). The emulsifier composition further includes the alcohol (e.g., glycerol). In some embodiments, the emulsifier comprises a solid. The presence of the alcohol (e.g., the glycerol) in the reaction solution facilitates a reduction in the pour point of the emulsifier.

In some embodiments, the emulsifier includes from about 30 weight percent to about 80 weight percent of the isomer of the acid-substituted amidoamine (e.g., of Structure (III)); from about 20 weight percent to about 60 weight percent of another material (e.g., one or both of Structure (I) or Structure (II)). In some embodiments, the another material comprises a hydrocarbyl ethoxylate having the formula $RO—(CH_2CH_2O)_nH$ wherein R is a $C_{5-22}$ (preferably $C_{16-22}$) hydrocarbyl group and n is an integer in the range of 2 to 30. In some embodiments, the emulsifier comprises a mixture of the heat treated acid-substituted amidoamine (Structure III), and one or more acid-substituted amidoamines (e.g., Structure (I) and/or Structure (II)).

The emulsifier and the one or more additional components (e.g., the alcohol) may be present in the emulsifier composition at a ratio of about 3.0:2.0 (about 1.5:1.0). In other words, for every 3 parts by mole of the emulsifier, the emulsifier composition may include 2 parts by mole of the one or more additional components. By way of non-limiting example, where the fatty acid ester comprises a triglyceride, the emulsifier composition includes 3 parts by mole of the emulsifier for every 2 parts by mole of glycerol. This is because the triglyceride includes three fatty acid chains, the amidoamine of the emulsifier includes two fatty acid chains (R and R'), and for every triglyceride, the reaction product forms one glycerol molecule.

The emulsifier may be present in the wellbore fluid composition within a range of from about 2.85 $kg/m^3$ (about 1.0 pound per barrel (ppb)) to about 85.6 $kg/m^3$ (about 30.0 ppb), such as from about 2.85 $kg/m^3$ (about 1.0 ppb) to about 1.5 $kg/m^3$ (about 4.28 ppb), from about 1.5 $kg/m^3$ (about 4.28 ppb) to about 2.5 $kg/m^3$ (about 7.13 ppb), from about 2.5 $kg/m^3$ (about 7.13 ppb) to about 5.0 $kg/m^3$ (about 14.3 ppb), from about 5.0 $kg/m^3$ (about 14.3 ppb) to about 7.5 $kg/m^3$ (about 21.4 ppb), from about 7.5 $kg/m^3$ (about 21.4 ppb) to about 10.0 $kg/m^3$ (about 28.5 ppb), from about 10.0 $kg/m^3$ (about 28.5 ppb) to about 15.0 $kg/m^3$ (about 42.8 ppb), from about 15.0 $kg/m^3$ (about 42.8 ppb) to about 20.0 $kg/m^3$ (about 57.1 ppb), from about 20.0 $kg/m^3$ (about 57.1 ppb) to about 25.0 $kg/m^3$ (about 71.3 ppb), or from about 25.0 $kg/m^3$ (about 71.3 ppb) to about 85.6 $kg/m^3$ (about 30.0 ppb). In some embodiments, the emulsifier is present in the drilling fluid composition within a range of from about 17.1 $kg/m^3$ (about 6.0 ppb) to about 32.2 $kg/m^3$ (about 12.0 ppb).

The one or more additional components may be present in the wellbore fluid composition within a range of from about 1.43 $kg/m^3$ (about 0.5 ppb) to about 28.5 $kg/m^3$ (about 10.0 ppb), 1.43 $kg/m^3$ (about 0.5 ppb) to about 2.85 $kg/m^3$ (about 1.0 ppb), from about 2.85 $kg/m^3$ (about 1.0 ppb) to about 1.5 $kg/m^3$ (about 4.28 ppb), from about 1.5 $kg/m^3$ (about 4.28 ppb) to about 2.5 $kg/m^3$ (about 7.13 ppb), from about 2.5 $kg/m^3$ (about 7.13 ppb) to about 5.0 $kg/m^3$ (about 14.3 ppb), from about 5.0 $kg/m^3$ (about 14.3 ppb) to about 7.5 $kg/m^3$ (about 21.4 ppb), or from about 7.5 $kg/m^3$ (about 21.4 ppb) to about 10.0 $kg/m^3$ (about 28.5 ppb). However, the disclosure is not so limited, and the wellbore fluid composition may include a different amount of the one or more additional components.

The wellbore fluid may further include one or more additives selected based on the desired properties of the wellbore fluid. As discussed above, and by way of non-limiting example, the one or more additional additives may include one or more of surfactants, bridging materials, viscosifiers, thinners, weighting materials, filtration control agents, shale stabilizers, pH buffers, scavengers, emulsion activators, gelling agents, shale inhibitors, defoamers, foaming agents, scale inhibitors, solvents, rheological additives, or other additives that may be suitable depending on the particular operation.

The scavenger may include, for example, zinc oxide, which may function as a hydrogen sulfide ($H_2S$) scavenger).

The surfactants may include anionic surfactants, cationic surfactants, and/or non-ionic surfactants. The foaming agents may include a nonionic surfactant including polymeric materials. The scale inhibitors may include an acrylic acid polymer, a maleic acid polymer, or a phosphonate. The solvents may include hydrocarbon solvents.

The bridging materials may include one or more of calcium carbonate, magnesium citrate, calcium citrate, calcium succinate, calcium maleate, calcium tartrate, magnesium tartrate, bismuth citrate, other suspended salts, mica, nutshells, fibers, or other building materials. In some embodiments, the building materials comprise calcium carbonate. The bridging material may be functionalized with one or more functional groups, such as one or more hydrophobic functional groups.

Viscosifiers of the wellbore fluid may include a material formulated and configured to increase the viscosity of the wellbore fluid and, optionally, to facilitate formation of a filtercake between the earth formation 101 and one or more of (e.g., each of) the drill string 105, casing 107, and liners. The viscosifier may include, for example, organic bentonite clay, an organic polymer (e.g., a cellulosic polymer), a polymer (e.g., a copolymer) formed from at least one acrylamide monomer and at least one sulfonated anionic monomer, or another polymer.

The viscosifier may constitute from about 0.5 weight percent to about 6.0 weight percent of the wellbore fluid, such as from about 0.5 weight percent to about 1.0 weight percent, from about 1.0 weight percent to about 2.0 weight percent, from about 2.0 weight percent to about 3.0 weight percent, or from about 3.0 weight percent to about 6.0 weight percent of the wellbore fluid. However, the disclosure is not so limited, and the weight percent of the viscosifier in the wellbore fluid may be different than that described.

Wellbore fluid thinners may include lignosulfates, lignitic materials, modified lignosulfonates, polyphosphates, tannin, and polyacrylates. The thinners may facilitate improved rheological properties of the wellbore fluid (e.g., a reduction in flow resistance) and a reduction in gel development. In addition, the thinner may reduce a thickness of filtercakes formed by the wellbore fluid, counteract the effects of salts, and reduce the effects of water on the earth formation 101.

Weighting materials (also referred to as "weighting agents") may include one or more of barite ($BaSO_4$), iron oxide (e.g., $Fe_2O_3$, $Fe_3O_4$), calcium carbonate ($CaCO_3$), magnesium carbonate ($MgCO_3$), manganese oxide ($Mn_3O_4$), or combinations thereof. The weighting material may be present in the wellbore fluid and facilitate increasing the density of the wellbore fluid up to about 2.88 $g/cm^3$ (about 24 pounds per gallon (ppg)).

A density of the wellbore fluid may be within a range of from about 1,080 $kg/m^3$ to about 2,500 $kg/m^3$, such as from about 1,080 $kg/m^3$ to about 1,200 $kg/m^3$, from about 1,200 $kg/m^3$ to about 1,400 $kg/m^3$, from about 1,400 $kg/m^3$ to about 1,600 $kg/m^3$, from about 1,600 $kg/m^3$ to about 1,800 $kg/m^3$, from about 1,800 $kg/m^3$ to about 2,000 $kg/m^3$, from about 2,000 $kg/m^3$ to about 2,200 $kg/m^3$, or from about 2,200 $kg/m^3$ to about 2,500 $kg/m^3$. However, the disclosure is not so limited, and the density of the wellbore fluid may be different than that described.

In use and operation, the emulsifier and/or the emulsifier composition may be added to a wellbore fluid, such as to a non-aqueous-based drilling fluid (e.g., an oil-based drilling fluid, a synthetic drilling fluid). The wellbore fluid including the emulsifier may function to form a stabile water-in-oil emulsion.

Forming the emulsifier from a fatty acid ester, such as from a triglyceride, rather than from a fatty acid facilitates the formation of an emulsifier composition having a greater purity of functioning emulsifier. In addition, triglycerides are widely available and reaction of the triglyceride with the polyalkylamine directly facilitates formation of the bis-amide without having to split the fatty acid ester (e.g., vegetable oil) to form respective fatty acids that make up the fatty acid ester. Accordingly, forming the emulsifier from the fatty acid ester eliminates the reaction to separate the fatty acids from the triglycerides (e.g., from the glycerol backbone of the triglyceride). In addition, the mixture of the fatty acid ester and the polyalkylamine forms a low viscosity mixture at temperatures over which the mixture is formed and reacted to form the bis-amide. By way of contrast, mixtures of fatty acids and polyalkylamines (e.g., DETA) form viscous mixtures, such as a viscous soap, at temperatures below about 100° C. Further, some triglycerides are polyunsaturated, and formation of corresponding polyunsaturated fatty acids from such triglycerides is difficult. Further still, and as described above, the reaction between the fatty acid ester and the polyalkylamine forms an alcohol byproduct (e.g., glycerol where the fatty acid ester is a triglyceride). Since the reaction of the fatty acid ester and the polyalkylamine does not form water (as the reaction between a fatty acid and the polyalkylamine), water may not contaminate the resulting bis-amide reaction product.

Figure 2:
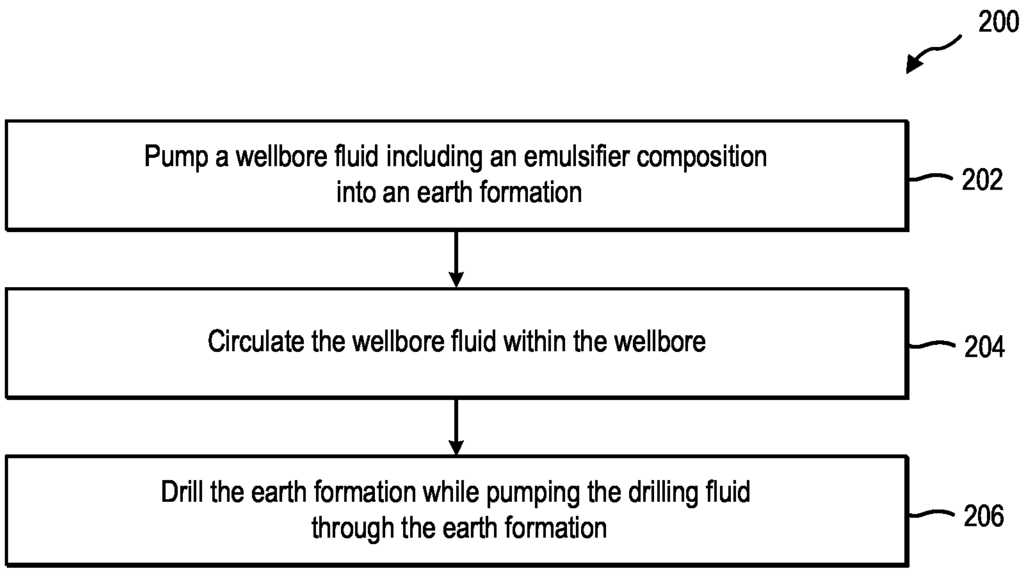
FIG. 2 is a simplified flow diagram illustrating a method of drilling a wellbore, according to at least one embodiment of the disclosure.

FIG. 2 is a simplified flow diagram illustrating a method 200 of operating a wellbore, according to at least one embodiment of the disclosure. The method 200 includes pumping a wellbore fluid including an emulsifier composition into an earth formation, as shown at act 202. The emulsifier composition may include one or more of the emulsifier compositions described above. For example, the emulsifier composition may include one or more of the emulsifiers and the one or more additional components (e.g., alcohols, such as glycerol) described above. The wellbore fluid may include, for example, a base fluid, the emulsifier composition, and one or more additives, as described above. In some embodiments, the wellbore fluid comprises a drilling fluid.

The method may include circulating the wellbore fluid through the wellbore, as shown in act 204. For example, the drilling fluid may be pumped from the surface of the earth formation, through the drill string 105, out of the bit 110, and through the annulus between the drill string 105 and the earth formation 101. In some embodiments, the wellbore fluid forms a stable emulsion (e.g., a water-in-oil emulsion) while the wellbore fluid is circulated through the wellbore 102.

The method 200 may further include drilling the earth formation while pumping the wellbore fluid into the earth formation, as shown at act 206. The wellbore fluid may facilitate removal of cuttings from the wellbore as the wellbore fluid circulates through the wellbore.

Figure 3:
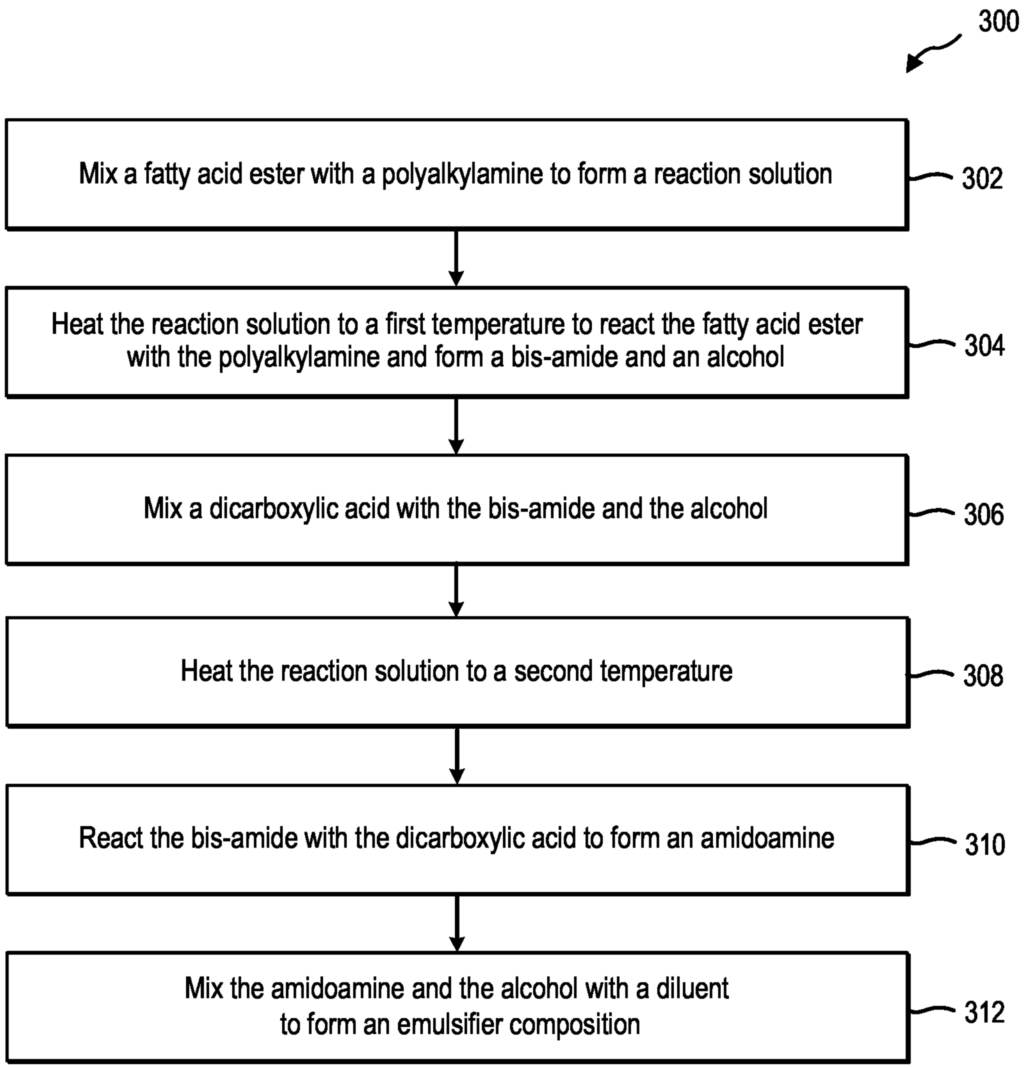
FIG. 3 is a simplified flow diagram illustrating a method of forming an emulsifier composition, according to at least one embodiment of the disclosure.

FIG. 3 is a simplified flow chart illustrating a method 300 of forming the emulsifier composition, according to at least one embodiment of the disclosure. The method 300 includes mixing a fatty acid ester with a polyalkylamine to form a reaction solution, as shown in act 302. The fatty acid ester and the polyalkylamine may include one or more of the respective fatty acid esters and the polyalkylamines described above. In some embodiments, the fatty acid ester comprises a triglyceride, such as vegetable oil; and the polyalkylamine comprises diethylenetriamine. In some embodiments, the fatty acid ester comprises more than one type of fatty acid ester.

Responsive to forming the reaction solution, the method 300 further includes heating the reaction solution to a first temperature to react the fatty acid ester with the polyalkylamine and form a bis-amide and an alcohol, as shown in act 304. In some embodiments, the reaction solution is heated to a temperature greater than about 110° C., such as greater than about 120° C., greater than about 130° C., or greater than about 140° C. In some embodiments, the reaction solution is heated to a temperature of about 140° C. The reaction solution may be mixed while heating the reaction solution to facilitate formation of the bis-amide. The bis-amide may include one or more of the bis-amides described above, and the composition of the bis-amide depends on the composition of the fatty acid ester and the polyalkylamine. In some embodiments, the reaction proceeds until the amine number of the reaction solution is about 90, indicating that the reaction is substantially completed. In some embodiments, after the reaction, the solution may exhibit minimal discoloration, indicating that undesired by-products are not substantially formed. In some embodiments, the reaction solution is heated and mixed for between about 3 hours and about 4 hours.

The method 300 may further include mixing a dicarboxylic acid with the bis-amide and the alcohol, as shown in act 306. The dicarboxylic acid may include one or more of the dicarboxylic acids described above. In some embodiments, the dicarboxylic acid comprises maleic acid. In other embodiments, the dicarboxylic acid comprises maleic anhydride, fumaric acid, succinic acid, succinic anhydride, or another dicarboxylic acid.

Responsive to mixing the dicarboxylic acid with the bis-amide and the alcohol, the method 300 further includes heating the reaction solution to a second temperature, as shown in act 308. The second temperature may be greater than the first temperature. The second temperature may be within a range of from about 140° C. to about 170° C. In some embodiments, the temperature is greater than about 150° C., such as greater than about 160° C., or greater than about 165° C. In some embodiments, the second temperature is about 165° C.

After heating the reaction solution to the second temperature, the method 300 further includes reacting the bis-amide with the dicarboxylic acid to form an amidoamine, as shown in act 310. In some embodiments, the reaction solution is mixed during the heating of the reaction solution. The reaction solution may be heated for a duration, such as about 2 hours. In some embodiments, the reaction solution is heated until the amine number of the reaction solution decreases below a threshold value, such as below about 20. The amidoamine may include one or more of the acid-substituted amidoamines described above with reference to Structure (I) and Structure (II). In addition, the amidoamine may include isomers of the acid-substituted amidoamines, as described above with reference to Structure (III).

In some embodiments, the amidoamine (e.g., the emulsifier) comprises a solid material at room temperature (e.g., about 20° C.). The amidoamine may be dispersed in a solution including the alcohol that forms during reaction of the fatty acid ester and the polyalkylamine. In some embodiments, the method 300 further includes mixing the amidoamine and the alcohol with a diluent to form an emulsifier composition, as shown in act 312. The diluent may include, for example, a base oil, such as a blend of 1-hexadecene and 1-octadecene, or another diluent. In some embodiments, the emulsifier composition comprises about 60 weight percent of the amidoamine and the alcohol, and about 40 weight percent of the diluent. In other embodiments, the emulsifier composition comprises about 60 weight percent of the amidoamine, and about 40 weight percent of the glycerol and the diluent. In other embodiments, the emulsifier composition is formed of and comprises the amidoamine and the alcohol in act 310.

While the method 300 has been described as including mixing the dicarboxylic acid with the bis-amide and the alcohol, the disclosure is not so limited. In other embodiments, the alcohol may be removed (e.g., separated) from the bis-amide prior to mixing the dicarboxylic acid with the bis-amide. In some such embodiments, water may be added to the solution including the bis-amide and the alcohol. The alcohol may be mixed with the water and the alcohol and water may be separated from the bis-amide. In some embodiments, the mixture is pressurized to reduce (e.g., prevent) the water from boiling, or the temperature of the reaction solution is maintained below the about 100° C. to prevent the water from boiling.

Forming the bis-amide from a fatty acid ester rather than from a fatty acid may reduce the amount of undesired reaction by-products, such as water and 1,2-bisamides. In addition, the alcohol (e.g., the glycerol) may remain in the emulsifier composition as a pour point depressant, reducing the pour point and the viscosity of the solution including the acid-substituted amidoamine and/or the isomers thereof.

EXAMPLES

Example 1

An emulsifier composition was formed from a fatty acid ester comprising vegetable oil, a polyalkylamine comprising diethylenetriamine, and a dicarboxylic acid comprising maleic acid. The reaction between the vegetable oil and the diethylenetriamine formed a 1,3-bisamide and glycerol. The reaction of the 1,3-bisamide and the maleic acid formed an amidoamine to form an emulsifier composition comprising the amidoamine emulsifier and the glycerol.

A wellbore fluid composition including the emulsifier composition was formed. The wellbore fluid composition included the composition shown in Table 1 below, wherein the emulsifier comprises the amidoamine (and does not include the alcohol of the emulsifier composition).

TABLE 1

| Material | Volume (ml) | Mass (pounds per barrel) (ppb) |
|---|---|---|
| Synthetic base fluid (IS 1618) | 176 | 137.6 |
| Emulsifier | 7.56 | 10.00 |
| Rheology conditioner | 4.44 | 4.0 |
| Wetting agent | 2.81 | 2.53 |
| Amine-treated bentonite | 0.31 | 0.50 |
| Lime | 2.14 | 5.0 |
| 25% $CaCl_2$ brine | 62.8 | 64.5 |
| Sepiolite | 5.42 | 13.00 |
| Polymeric fluid loss additive | 0.75 | 0.8 |
| Organic gelling agent | 2.76 | 2.5 |
| Mirconized barite | 84.6 | 350.9 |

The wellbore fluid composition was mixed with water to form an oil-in-water composition comprising 77 volume percent water and 23 volume percent oil and a density of about 14.3 pounds per gallon (ppg) (about 1,714 kg/$m^3$).

The wellbore fluid composition of Table 1 was compared to baseline wellbore fluid compositions not including the emulsifier compositions described herein. The baseline wellbore fluid included an emulsifier formed from a bis-amide formed from the reaction of tall oil fatty acids and diethylenetriamine (referred to as a "baseline emulsifier"), followed by reaction of the bis-amide with maleic acid. Muds were formed from the wellbore fluid compositions and hot rolled at a temperature of about 162.8° C. (about 325° F.) for about 16 hours. The performance of the muds was compared, including the shear stress of the muds (e.g., the shear stress of the drilling fluids after hot rolling using a rotational couette viscometer at different rotation speeds and temperatures). In addition, the gel strength of the muds and the fluid loss of the muds when exposed to HPHT testing at a differential pressure at about 162.8° C. (about 325° F.) were also tested. The results are shown in Table 2, where column 1 represents the mud including the baseline emulsifier; column 2 represents a mud including the emulsifier formed according to embodiments described herein, but not including the alcohol (e.g., the glycerol); and column 3 represents a mud including the emulsifier formed according to embodiments described herein and including the alcohol. The amount of the amidoamine emulsifier in each case was 6.8 ppb in each mud.

TABLE 2

| | Baseline Fluid | | Without Glycerol | | With Glycerol | |
|---|---|---|---|---|---|---|
| Heat aging temp, ° F. | 325 | | 325 | | 325 | |
| Heat aging, hr | 16 | | 16 | | 16 | |
| Static/rolling | D | | D | | D | |
| Mud weight, lb/gal | 14.3 | | 14.30 | | 14.30 | |
| Rheology temp, ° F. | 40 | 150 | 40 | 150 | 40 | 150 |
| R600, °VG | 231 | 73.8 | 225.2 | 75 | 246.5 | 84.4 |
| R300, °VG | 125 | 44.5 | 128.9 | 46.9 | 138.3 | 50 |
| R200, °VG | 87.1 | 33.1 | 90.1 | 34.5 | 100.3 | 36.5 |
| R100, °VG | 48.4 | 20.6 | 51.5 | 21.4 | 56.7 | 22.7 |
| R6, °VG | 8.7 | 7.7 | 10.5 | 8.2 | 10.8 | 9.2 |
| R3, °VG | 7.2 | 7.4 | 8.6 | 8.2 | 8.6 | 9.3 |
| Plastic viscosity, cp | 106 | 29 | 96 | 28 | 108 | 34 |
| Yield point, lb/100 $ft^2$ | 19 | 15 | 33 | 19 | 30 | 16 |
| LSYP, lb/100 $ft^2$ | 6 | 7 | 7 | 8 | 6 | 9 |
| 10-sec gel, lb/100 $ft^2$ | 9.8 | 10 | 11.7 | 9.6 | 11 | 10.4 |
| 10-min gel, lb/100 $ft^2$ | 25.2 | 25 | 30.7 | 30.1 | 25.6 | 30.1 |
| HTHP Temp, ° F. | | 325 | | 325 | | 325 |
| HTHP FL, ml | | 1.5 | | 2 | | 1.3 |
| Water in HTHP filtrate | | 0 | | 0 | | 0 |

As shown in Table 2, none of the compositions resisted filtration during the HTHP testing, indicating that the compositions exhibited a strong emulsion, which resist filtration. In addition, there was no water present in the filtrate. Surprisingly, the composition including the emulsifier and the glycerol exhibited reduced fluid loss than the mud including the conventional emulsifier.

Example 2

An emulsifier composition was formed in which the fatty acid ester comprises fish oil, which includes a relatively high degrees of unsaturated fatty acid chains. A wellbore fluid including the emulsifier composition was prepared. The wellbore fluid included the same composition of the wellbore fluids described with respect to Example 1 and included about 6.8 ppg of the emulsifier.

TABLE 3

| Heat Aging, hr | 16 | | 16 h + 5 day | |
|---|---|---|---|---|
| Static/Rolling | D | | S | |
| Mud Weight, lb/gal | 14.30 | | 14.30 | |
| Rheology Temp, ° F. | 40 | 150 | 40 | 150 |
| R600, ° VG | 214 | 70.1 | 237 | 81.8 |
| R300, ° VG | 121 | 41.2 | 134 | 50.8 |
| R200,° VG | 85.6 | 31 | 96.2 | 37.8 |
| R100, ° VG | 48.8 | 18.4 | 53.3 | 23.3 |
| R6, ° VG | 7.9 | 5.2 | 6.1 | 6 |
| R3, ° VG | 6.5 | 5 | 4.3 | 5.6 |
| PV, cP | 93 | 29 | 103 | 31 |
| YP, lb/100 $ft^2$ | 28 | 12 | 31 | 20 |
| LSYP, lb/100 $ft^2$ | 5 | 5 | 3 | 5 |
| 10-sec Gel, lb/100 $ft^2$ | 8 | 5.1 | 5.3 | 7.4 |
| 10-min Gel, lb/100 $ft^2$ | 26.4 | 37.4 | 13.3 | 54.2 |
| HTHP Temp, ° F. | | 325 | | 325 |
| HTHP FL, ml | | 2 | | 5 |
| Water in HTHP Filtrate, ml | | 0 | | 0 |

As shown in Table 3, the wellbore fluid including the emulsifier composition formed from fish oil exhibited relatively low fluid loss after hot rolling, even after hot rolling for 16 hours and static aging for 5 days. In addition, the filtrate was substantially free of water.

Example 3

An emulsifier composition was formed in which the fatty acid ester comprises algal oil was prepared. The algal oil included a high amount of oleic acid. A wellbore fluid including the emulsifier composition was prepared. The wellbore fluid included the same composition of the wellbore fluids described with respect to Example 1 and included about 6.8 ppg of the emulsifier.

TABLE 4

| | | |
|---|---|---|
| Heat Aging Temp, ° F. | 325 | |
| Heat Aging, hr | 16 | |
| Static/Rolling | D | |
| Mud Weight, lb/gal | 14.30 | |
| Rheology Temp, ° F. | 40 | 150 |
| R600, ° VG | 232 | 78.9 |
| R300, ° VG | 132 | 46.7 |
| R200, ° VG | 96.5 | 34.8 |
| R100, ° VG | 55.2 | 21.5 |
| R6, ° VG | 10.6 | 8.3 |
| R3, ° VG | 8.8 | 8.2 |
| PV, cP | 100 | 32 |
| YP, lb/100 $ft^2$ | 32 | 15 |
| LSYP, lb/100 $ft^2$ | 7 | 8 |
| 10-sec Gel, lb/100 $ft^2$ | 11.1 | 10.8 |
| 10-min Gel, lb/100 $ft^2$ | 27 | 28.2 |
| HTHP Temp, ° F. | | 325 |
| HTHP FL, ml | | 3 |
| Water in HTHP Filtrate, ml | | 0 |

With reference to Table 4, the wellbore fluid including the emulsifier composition formed from algal oil exhibited relatively low fluid loss after hot rolling, even after aging for 16 hours and 5 days. In addition, the filtrate was substantially free of water.

Example 4

An emulsifier composition was formed in which the fatty acid ester comprises palm oil was prepared. Palm oil may be beneficial because it is widely available and relatively less expensive compared to other fatty acid oils. The emulsifier composition was prepared by heating a reaction solution including palm oil and diethylenetriamine to a temperature of about 140° C. for about 4 hours. The conversion of the palm oil to a bis-amide was measured by measuring the amine number. After about 4 hours, the amine number was about 83. Maleic acid was added to the reaction solution and the reaction solution was heated to about 165° C. for about 2 hours until the amide number reached about 19. After the amine number reached about 19, the emulsifier composition was diluted with a mixture of a 1-hexadecene and 1-octadecene diluent and butoxytriglycol ether (BTG). The diluted composition included about 60 weight percent of the emulsifier, about 20 weight percent of the diluent, and about 20 weight percent of the BTG.

A wellbore fluid including the emulsifier composition was prepared. The wellbore fluid included the same composition of the wellbore fluids described with respect to Example 1, except that the wellbore fluid included a different fluid loss additive and a different amount of the emulsifier. The wellbore fluid included about less than about 6.8 ppg of the emulsifier. Table 5 below shows the performance properties of the wellbore fluid.

TABLE 5

| Emulsifier, ppb | 5 | | 6.8 | | 10 | |
|---|---|---|---|---|---|---|
| Heat aging temp, ° F. | 325 | | 325 | | 325 | |
| Heat aging, hr | 16 | | 16 | | 16 | |
| Static/rolling | D | | D | | D | |
| Mud weight, lb/gal | 14.3 | | 14.30 | | 14.30 | |
| Rheology temp, ° F. | 40 | 150 | 40 | 150 | 40 | 150 |
| R600, °VG | 236 | 85.7 | 260 | 91.2 | 290 | 75.3 |
| R300, °VG | 140 | 52.7 | 149 | 52.3 | 170 | 47.2 |
| R200, °VG | 105 | 39.8 | 109 | 39.2 | 125 | 35.5 |
| R100, °VG | 66 | 26.1 | 67.9 | 25.6 | 76.5 | 22.2 |
| R6, °VG | 19 | 12.1 | 17.3 | 11.8 | 17.7 | 8 |
| R3, °VG | 17.2 | 12 | 15 | 11.5 | 16 | 8 |
| Plastic viscosity, cp | 96 | 33 | 111 | 39 | 120 | 28 |
| Yield point, lb/100 $ft^2$ | 44 | 20 | 39 | 13 | 50 | 19 |
| LSYP, lb/100 $ft^2$ | 15 | 12 | 13 | 11 | 14 | 8 |
| 10-sec gel, lb/100 $ft^2$ | 18.8 | 14.1 | 16.4 | 17.4 | 14.7 | 9 |
| 10-min gel, lb/100 $ft^2$ | 46.8 | 29.5 | 46.8 | 34 | 34 | 16 |
| E.S. at 150° F., V | | 656 | | 438 | | 681 |
| HTHP Temp, | | 325 | | 325 | | 325 |
| HTHP FL, ml | | 10 | | 1.6 | | 1.4 |
| Water in HTHP filtrate | | 0.1 | | 0 | | 0 |

As shown in Table 5, the wellbore fluids including the emulsifier compositions formed from palm oil exhibited a low amount of fluid loss, indicating that the emulsifier compositions formed a stable emulsion. In addition, there was no water present in the filtrate when the emulsifier was present at 6.8 ppg and 10.0 ppg, and a negligible amount of water present in the filtrate when the emulsifier was present at about 5.0 ppg.

At a concentration of 6.8 ppg and 10.0 ppg of the emulsifier, the wellbore fluid exhibited an increased viscosity at 4.4° C. (about 40° F.) relative to a tall oil fatty acid-based emulsifier. It is believed that because the palm oil includes $C_{16}$ fatty acids (e.g., $C_{16}$ saturated fatty acids), the $C_{16}$ fatty acid chains increase the viscosity of the wellbore fluid including the emulsifiers formed from palm oil. However, relatively lower amount of the emulsifier still exhibited sufficient fluid loss properties. In addition, in some embodiments, the wellbore fluid includes a pour point depressant (e.g., 2-octanol) that further reduces the pour point of the wellbore fluid.

The embodiments of wellbore (e.g., drilling) fluids including the emulsifier compositions described herein have been primarily described with reference to wellbore drilling operations; the wellbore fluids including emulsifier compositions described herein may be used in applications other than the drilling of a wellbore. In other embodiments, drilling fluids including the emulsifier compositions according to the present disclosure may be used outside a wellbore or other downhole environment used for the exploration or production of natural resources. For instance, drilling fluids including the emulsifier compositions of the present disclosure may be used in a borehole used for placement of utility lines. Accordingly, the terms "wellbore," "borehole," and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A wellbore fluid, comprising:

a base fluid; and an emulsifier composition comprising:

an emulsifier comprising a reaction product of a bis-amide and at least one of maleic acid, maleic anhydride, fumaric acid, succinic acid, or succinic anhydride; and glycerol;

wherein a molar ratio of the emulsifier to the glycerol is about 1.5:1.0.

2. The wellbore fluid of claim 1, wherein the bis-amide comprises a reaction product of a fatty acid ester and a polyalkylamine.

3. The wellbore fluid of claim 2, wherein the polyalkylamine comprises diethylenetriamine.

4. The wellbore fluid of claim 2, wherein the fatty acid ester comprises a triglyceride.

5. The wellbore fluid of claim 2, wherein the fatty acid ester comprises vegetable oil.

6. The wellbore fluid of claim 2, wherein the fatty acid ester comprises palm oil.

7. The wellbore fluid of claim 1, wherein the bis-amide comprises a reaction product of a triglyceride and diethylenetriamine.

8. The wellbore fluid of claim 7, wherein the triglyceride comprises at least one of vegetable oil, fish oil, algal oil, or palm oil.

9. The wellbore fluid of claim 1, wherein the emulsifier comprises a mixture of the following structures:

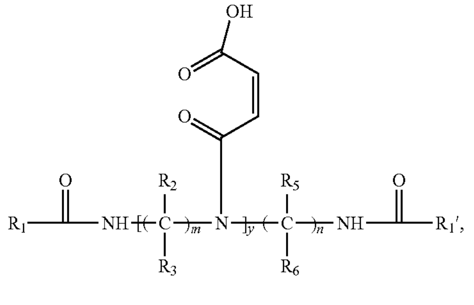

-continued

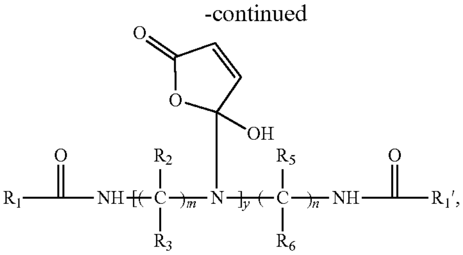

and

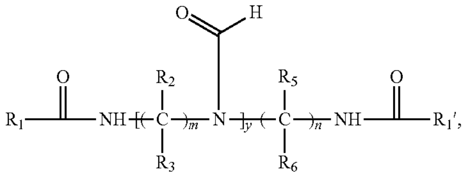

wherein:

$R_1$ and $R_1'$ individually comprise a $C_4$ to $C_{30}$ hydrocarbyl group;

$R_2$, $R_3$, $R_5$, and $R_6$ are independently hydrogen, $C_1$ to $C_4$ alkyl groups, $C_1$ to $C_4$ alkoxyalkyl groups, or $C_1$ to $C_4$ hydroxyalkyl groups;

n and m are integers from 1 to 10; and y is an integer from 1 to 5.

10. The wellbore fluid of claim 9, wherein $R_1$ and $R_1'$ comprise different hydrocarbyl groups.

11. The wellbore fluid of claim 1, wherein the emulsifier is formed by a process comprising:

heating a fatty acid ester and a polyalkylamine to a first temperature to react the fatty acid ester with the polyalkylamine and form a bis-amide and an alcohol;

mixing a dicarboxylic acid with the bis-amide and the alcohol to form a reaction solution; and heating the reaction solution to a second temperature to react the bis-amide with the dicarboxylic acid and form an acid-substituted amidoamine and an isomer of the acid-substituted amidoamine.

12. The wellbore fluid of claim 1, wherein the emulsifier comprises an amidoamine including at least one unsaturated fatty acid chain.

13. A method of operating a wellbore, the method comprising:

pumping a drilling fluid into a wellbore extending through an earth formation, the drilling fluid comprising:

a base fluid; and an emulsifier composition comprising:

an emulsifier comprising an amidoamine comprising a reaction product of a bis-amide and a dicarboxylic acid, the bis-amide comprising a reaction product of a fatty acid ester and diethylenetriamine; and glycerol;

wherein a molar ratio of the emulsifier to the glycerol is about 1.5:1.0; and circulating the drilling fluid through the wellbore while drilling the earth formation.

14. The method of claim 13, wherein pumping a drilling fluid into a wellbore comprises pumping a drilling fluid comprising an emulsifier comprising the following structure into the wellbore:

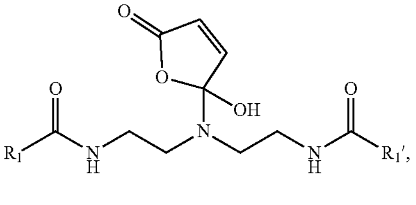

wherein $R_1$ and $R_1'$ individually comprise a fatty acid chain.

15. The method of claim 14, wherein pumping a drilling fluid into a wellbore comprises pumping a drilling fluid comprising different fatty acid chains into the wellbore.

16. The method of claim 13, wherein pumping a drilling fluid into a wellbore comprises pumping a drilling fluid comprising an emulsifier comprising an amidoamine comprising a reaction product of the bis-amide and the dicarboxylic acid, wherein the bis-amide comprises a reaction product of vegetable oil and diethylenetriamine.

17. A method of forming an emulsifier composition for a wellbore fluid, the method comprising:

mixing a fatty acid ester with a polyalkylamine to form a bis-amide and an alcohol;

mixing a dicarboxylic acid with the bis-amide and the alcohol to form a reaction mixture; and heating the reaction mixture and reacting the bis-amide with the dicarboxylic acid to form an emulsifier comprising a reaction product of the bis-amide and the dicarboxylic acid and an emulsifier composition comprising the emulsifier and the alcohol;

wherein the alcohol comprises glycerol, and wherein a molar ratio of the emulsifier to the glycerol is about 1.5:1.0.

18. The method of claim 17, wherein mixing a fatty acid ester with a polyalkylamine to form a bis-amide and an alcohol comprises mixing a triglyceride with diethylenetriamine to form the bis-amide and glycerol.

19. The method of claim 17, further comprising heating the fatty acid ester and the polyalkylamine to a first temperature to form the bis-amide and the alcohol, wherein heating the reaction mixture comprises heating the reaction mixture to a second temperature higher than the first temperature to react the bis-amide with the dicarboxylic acid.

* * * * *